US008301653B2

(12) United States Patent
Adamousky et al.

(10) Patent No.: US 8,301,653 B2
(45) Date of Patent: Oct. 30, 2012

(54) SYSTEM AND METHOD FOR CAPTURING AND REPORTING ONLINE SESSIONS

(76) Inventors: Glenn Adamousky, Edison, NJ (US); Dennis Nagy, Edison, NJ (US)

(*) Notice: Subject to any disclaimer, the term of this patent is extended or adjusted under 35 U.S.C. 154(b) by 192 days.

(21) Appl. No.: 12/657,660

(22) Filed: Jan. 25, 2010

(65) Prior Publication Data
US 2011/0184982 A1 Jul. 28, 2011

(51) Int. Cl.
*G06F 17/30* (2006.01)

(52) U.S. Cl. .................. 707/769; 707/771; 707/776

(58) Field of Classification Search .................. 707/769, 707/781, 771, 776
See application file for complete search history.

(56) References Cited

U.S. PATENT DOCUMENTS

| | | | | |
|---|---|---|---|---|
| 6,023,507 | A * | 2/2000 | Wookey | 709/224 |
| 6,286,030 | B1 * | 9/2001 | Wenig et al. | 709/203 |
| 6,336,133 | B1 * | 1/2002 | Morris et al. | 709/204 |
| 6,978,304 | B2 * | 12/2005 | Fertell et al. | 709/224 |
| 7,382,479 | B2 * | 6/2008 | Hirose et al. | 358/1.15 |
| 7,444,319 | B1 * | 10/2008 | Sathyanarayan | 1/1 |
| 7,634,571 | B2 * | 12/2009 | Fertell et al. | 709/227 |
| 7,689,613 | B2 * | 3/2010 | Candelore | 707/707 |
| 7,925,305 | B2 * | 4/2011 | Honda | 455/566 |
| 2002/0032770 | A1 * | 3/2002 | Fertell et al. | 709/224 |
| 2004/0030989 | A1 * | 2/2004 | Samuels et al. | 715/500 |
| 2004/0044775 | A1 * | 3/2004 | Takano et al. | 709/227 |
| 2004/0080770 | A1 * | 4/2004 | Hirose et al. | 358/1.13 |
| 2004/0153530 | A1 * | 8/2004 | Machida | 709/220 |
| 2005/0027723 | A1 * | 2/2005 | Jones et al. | 707/100 |
| 2007/0051814 | A1 * | 3/2007 | Ehrhart et al. | 235/462.08 |
| 2007/0266319 | A1 * | 11/2007 | Matsuo | 715/700 |
| 2008/0016520 | A1 * | 1/2008 | Kong | 719/329 |
| 2008/0059198 | A1 * | 3/2008 | Maislos et al. | 704/273 |
| 2008/0066179 | A1 * | 3/2008 | Liu | 726/24 |
| 2008/0097984 | A1 * | 4/2008 | Candelore | 707/5 |
| 2009/0012965 | A1 * | 1/2009 | Franken | 707/10 |
| 2009/0089417 | A1 * | 4/2009 | Giffin et al. | 709/224 |
| 2009/0113515 | A1 * | 4/2009 | Zalewski | 726/1 |
| 2010/0037172 | A1 * | 2/2010 | Griffith et al. | 715/777 |
| 2010/0175129 | A1 * | 7/2010 | Doddy et al. | 726/22 |
| 2010/0176201 | A1 * | 7/2010 | Ehrhart et al. | 235/462.11 |
| 2010/0179991 | A1 * | 7/2010 | Lorch et al. | 709/206 |
| 2010/0228728 | A1 * | 9/2010 | Weber et al. | 707/723 |
| 2010/0268682 | A1 * | 10/2010 | Lewis et al. | 706/54 |
| 2010/0278381 | A1 * | 11/2010 | Tessman et al. | 382/100 |
| 2010/0287163 | A1 * | 11/2010 | Sridhar et al. | 707/740 |
| 2011/0131235 | A1 * | 6/2011 | Petrou et al. | 707/769 |
| 2011/0137895 | A1 * | 6/2011 | Petrou et al. | 707/723 |
| 2011/0178793 | A1 * | 7/2011 | Giffin et al. | 704/9 |

* cited by examiner

*Primary Examiner* — Thanh-Ha Dang (74) *Attorney, Agent, or Firm* — Gearhart Law, LLC (57) ABSTRACT

The present invention discloses a computer system for reporting online sessions and a computer enabled method utilizing the same. The computer system is made up of an icon that preferably appears on a user screen. The icon is capable of capturing a screen session on the user screen and saving it within a recording. The recording may then be communicated to a database server that is capable of extracting a plurality of target components from said recording, and is capable of storing them in a database. The database may contain a benchmark content of the plurality of target components. Target components may then be compared against the benchmark content in a variety of ways to determine whether the level of target components is above or below reasonable and socially accepted levels.

12 Claims, 4 Drawing Sheets

SYSTEM AND METHOD FOR CAPTURING AND REPORTING ONLINE SESSIONS

FIELD OF THE INVENTION

The invention relates to a computer system and computer enabled method for monitoring activities occurring during a display session.

BACKGROUND OF THE INVENTION

The invention relates to a telecommunication system and a method for using such a system to record, store, archive and report activities occurring on a user's (computer, television, electronic gaming device, telephone, cell phone, e-fax, or any other type of electronic or telecommunication display). The preferred use disclosed in the present invention may be to capture electronic mail (email), text, voice and or video chat using speech recognition, images, video or chat sessions for records or for a possible review and investigation. The aim is to have a tool that can readily capture and record an ongoing event both online and in person that a user of this event deems to be offensive, threatening or otherwise suspicious. In addition to these sessions it can also be used to capture, record, archive, forward, store, report or otherwise transfer materials deemed as offensive, alarming or inappropriate such as websites, facebook or myspace "social media type" pages, web blogs or "blogs" or any other type of event, picture, graphic or communication media that the user may regard as needing to be reported. However, the present invention may be used for other purposes, for example, as a record keeping tool for recording application sessions, reporting violations of company and other institutional policies or a person witnessing someone leaving luggage alone at an airport. Presently, a lot of interpersonal communication occurs over the course of chat and email sessions between individuals and groups. These chat sessions usually take place between two or more remote users that are connected to the World Wide Web or the internet, or the global computer network (GCN). Chats may also occur over a local area network, for example between employees of a single enterprise, or electronic communication may also take place over the global system for mobile communication (GSM), or a similar communication system that provides a communication network for wireless devices.

Chat and email, and other electronically enabled communication forums have many benefits. For instance, two remote locations or individuals may now be linked together instantaneously, considerable privacy and discreteness may be provided, especially if the messages are encrypted, and chat and email is almost always free of charge. Additionally, most recent software innovations have enhanced the ease of electronic communication channels. For example, advances such as stateful or threaded chat room presence enables remote users to monitor whether their chat buddies are connected to the internet, or whether they have stepped away or are too busy to participate.

However, electronic sessions also offer some significant caveats and drawbacks that the present invention addresses. One downside of electronic communication versus more traditional methods is that such communication often occurs between unfamiliar parties. Most often, the users are only able to see the other side's input characters, but not the individuals themselves, their demeanor, body language or age. Such communication is driven by trust, a trust that is often abused and used to exploit the naïve or unwary. However, even in cases where users know each other, there may be times where the substance of an electronic exchange involves topics that can potentially pose significant consequences to those involved in the conversations or to the object of the conversation. When this occurs, either party may want to record the exchange, or even to alert a responsible third party, such as law enforcement, a regulatory body, an overseeing party, or a party having legal interest. Thus, a primary purpose of this invention is for a user to be able to notify Safety Net Interactive, Inc. or any other designated or licensed entity that is contracted by SNI of predatory, improper, illegal or otherwise prohibited behavior experienced in a online or in person event.

Presently, virtually all software tools that enable remote communication also offer ways to store or record a particular communication within a record, a file or other means. However, multiple individual sessions must be recorded separately. This is also true for non-internet related software applications. Each separate instance of a software application must be separately memorialized and recorded. Additionally, saving is not always available, and a screen capture may be the best solution. Also of significance, is that the presently available screen capture tools create an image that cannot be searched or edited, whereas the present invention is able to parse the image in search of text strings and characters.

Furthermore, the effectiveness of these computer and other telecommunications systems that are state of the art are significantly reduced by the lack of a direct reporting link between a party doing the recording and a party interested in its contents. For example, a private citizen or a business associate may lack the knowledge or ability to contact proper echelons of law enforcement or other authoritative, corporate, organization or legally interested parties (schools, towns, states or country) to report threatening, abusive, bullying abrasive, sexually explicit or any offensive communications. On the other end, Law enforcement, schools, towns states, country or corporate compliance officers may lack tools or knowledge in determining whether something is benign or truly ominous.

Finally, the present methods often do not guarantee confidentiality. The possibility of exposure of a particular exchange and negative consequences of such an exposure on a victim, frequently discourage reporting. For example, youngsters may be reluctant to contact authorities for fear of alerting parents or school officials. Junior staffers may fear that disclosure may expose their online or social activity to their superiors and jeopardize their employment prospects. The present invention addresses this by providing an independent third party analyzer tool that can determine if the sessions are truly hostile or offensive, and which is able to alert law enforcement or another appropriate remedial body, without also alerting the victim's parents or superiors.

Various implements are known in the art, but fail to address all of the problems solved by the invention described herein. One embodiment of this invention is illustrated in the accompanying drawings and will be described in more detail herein below.

SUMMARY OF THE INVENTION

The present invention discloses a computer system for reporting online sessions and a computer enabled method utilizing the same. The computer system is made up of an icon that preferably appears on a user screen. The icon is capable of capturing a screen session on the user screen and saving it within a recording. The recording may then be communicated to a database server that is capable of extracting a plurality of target components from said recording, and is capable of storing these target components in a database. The database may contain a benchmark content of the plurality of target components. Target components may then be compared against the benchmark content in a variety of ways to determine whether the level of target components is above or below reasonable and socially accepted levels, or other configurable levels.

Therefore, the present invention succeeds in conferring the following, and others not mentioned, desirable and useful benefits and objectives.

It is an object of the present invention to provide a screen capturing tool of a user's display session.

It is another object of the present invention to provide a reporting tool, where a user's screen session is reported to an independent third party or analyzer.

Yet another object of the present invention is to provide a reporting tool that is capable of parsing captured images into searchable characters and strings.

Still another object of the present invention is to provide a tool with various algorithmic approaches for determining whether the content of the target components represents a sufficient threat to warrant attention of law enforcement or other enforcement agency. After it has been through the system and has had a SNI screener also look at it.

Still another object of the present invention is to provide a reporting tool having an independent database for storing reports and benchmark content.

Yet another object of the present invention is to provide a search module to law and policy enforcement officers, who may search the database against a set of target components.

Still another object of the present invention is to provide a capturing tool that may be started automatically as a background process, and which can be activated with a click of a mouse or another type of fast activation.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations are possible.

Figure 1:
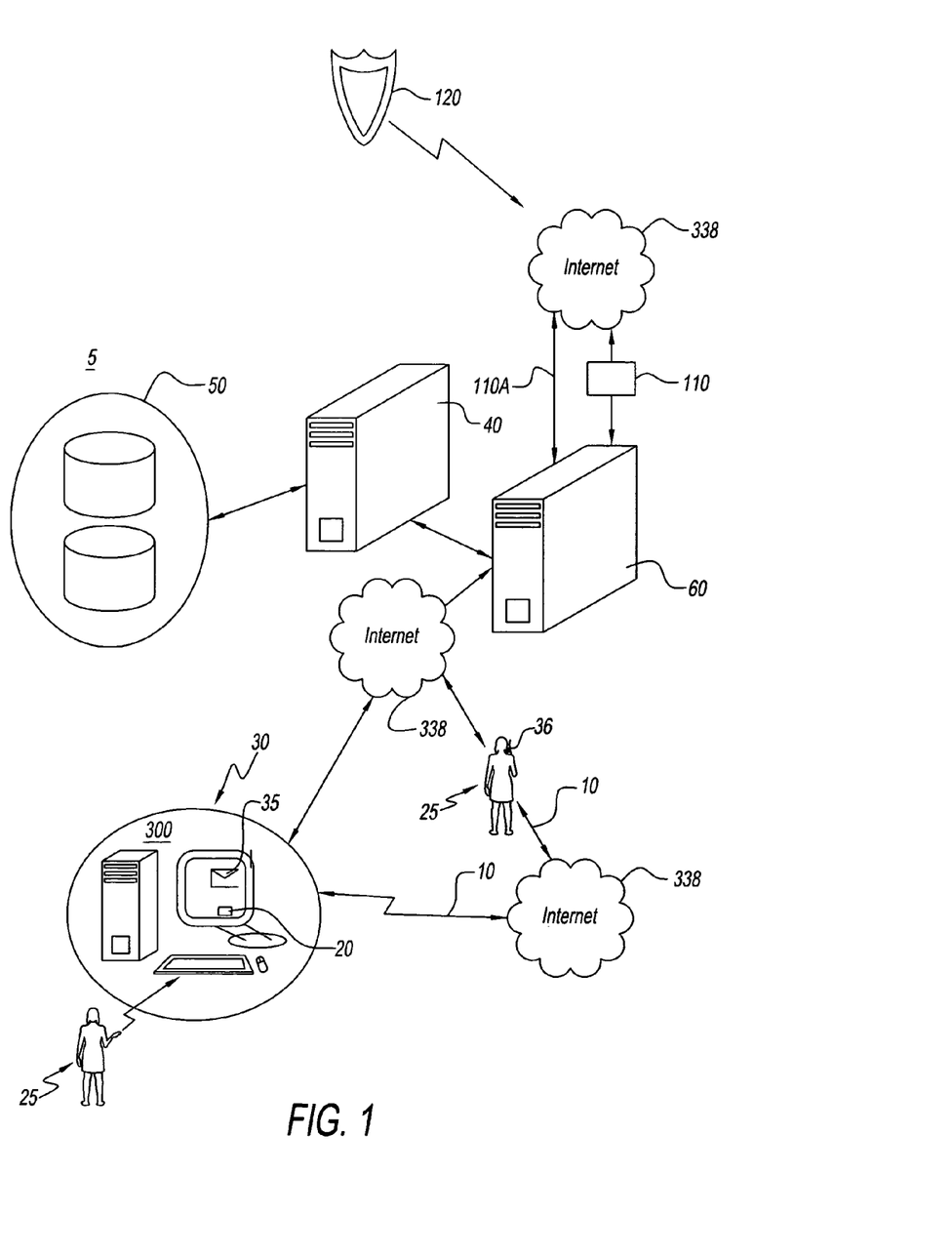
FIG. 1 is a flow chart of a computer system disclosed in by the present invention.

Referring now to FIG. 1, shown are the main components of the present invention, namely, a computer system 5, an online session 10 connecting to a global computer network (GCN) or the Internet 338 (FIG. 4), an icon 20, a user 25, a user screen 30, a recording 35, a database server 40, a database 50, a relay server 60, a search module 110, access by third parties 120.

An online session 10 may be referring to any session that is currently occurring on the user's screen 30, including, but not limited to, a word processing or data entry sessions, or any other administrative sessions which may need to be recorded for a later review. Preferably, the online session 10 refers to a chat session, an email session, a blog session or any other session that represents a communication over two or more interconnected user systems 300. The interconnected user systems 300 may be connected via the internet 338, or reside in a local area network (LAN) of a public or private enterprise, or a non-commercial establishment. Whatever the setting, the present invention may be used to record specific type of communication; for example, violent, vulgar, predatory, threatening, or sexually explicit messages and images. Alternatively, the present invention may also be used to record any other kind of communication for the purposes of records keeping.

A typical session occurs over the internet 338 from a user screen 30 by using a web browser, such as, but not limited to Internet Explorer, Mozilla Firefox, Apple Safari, Google Chrome or Netscape Navigator or any other browser enabled for this purpose. A user may access a website to launch a separate chat application or the chat application may be installed locally or get launched outside of the web browser. Other chatting applications may exist within other types of applications; for example a Sametime® application may be launched from within an IBM's Lotus Notes® application.

The icon 20 may be referred to as the client application that runs independently, managed only by the local operating system 310 of the user system 300 where the icon 20 has been installed or running. The icon 20 may be a stand alone software application that is capable of receiving, initiating or maintaining contact with another user system 300. In the present invention the icon 20 may need to be in contact, or may receive and send messages and other data between the user's computer 300 and either the database server 40 or the relay server 60. Depending on the scale of the embodiment, either the database server 40 or the relay server 60, or both, may be present in an embodiment of the present invention. Additionally, the icon 20 may communicate with the database server 40 through the relay server 60, or the icon 20 may communicate directly with the database server 40.

The icon 20 contains an iconic or a graphical front end of an overall software application, where all parts may be written in C, C++, C#, Visual Basic, or any other language, such as Java, that may be used to create software for data and transactional processing. The icon 20 may necessarily need to interact with system resources and interfaces provided by the operating system 310. One skilled in the art of software development may appreciate that an application of this type may include code sections or objects for interacting with system resources, such as hardware resources, CPU time, and processing or network bandwidth. Alternatively, an application may be build within a COM or COM+ framework or a .Net framework, or a Websphere or a Weblogic framework, or any other framework, where all standard system, security, networking, and data management objects, as well as most graphical objects are supplied by the framework software, with a skilled developer supplying the business logic necessary to enable the icon software 20 functionality described herein.

The graphical interface of the present invention may preferably be contained within the icon 20 which may be running as a separate service or a daemon, and which may be present in miniature within the notification section of a Windows® task bar. The icon 20 may also be set to run upon request such as a mouse click on a miniature desktop or start menu icon representing the icon 20, or the icon 20 may be running as background process in any other type of runtime environment, where a runtime environment refers to a combination comprising an operating system 310, hardware resources and a preferred blend of other ancillary applications. The icon 20 may be further enhanced with logic enabling popup notifications or an event monitor to respond to mouse-over events or other usage events. When a user wishes to record an online session 10, he or she may activate the icon 20 with a click of a mouse or a typed command, to bring up a supporting interface or to expand the interface within the icon 20. The icon 20 may also be activated quickly with a hotkey, a keyboard key or key combination assigned by the icon 20 for such operation.

Figure 4:
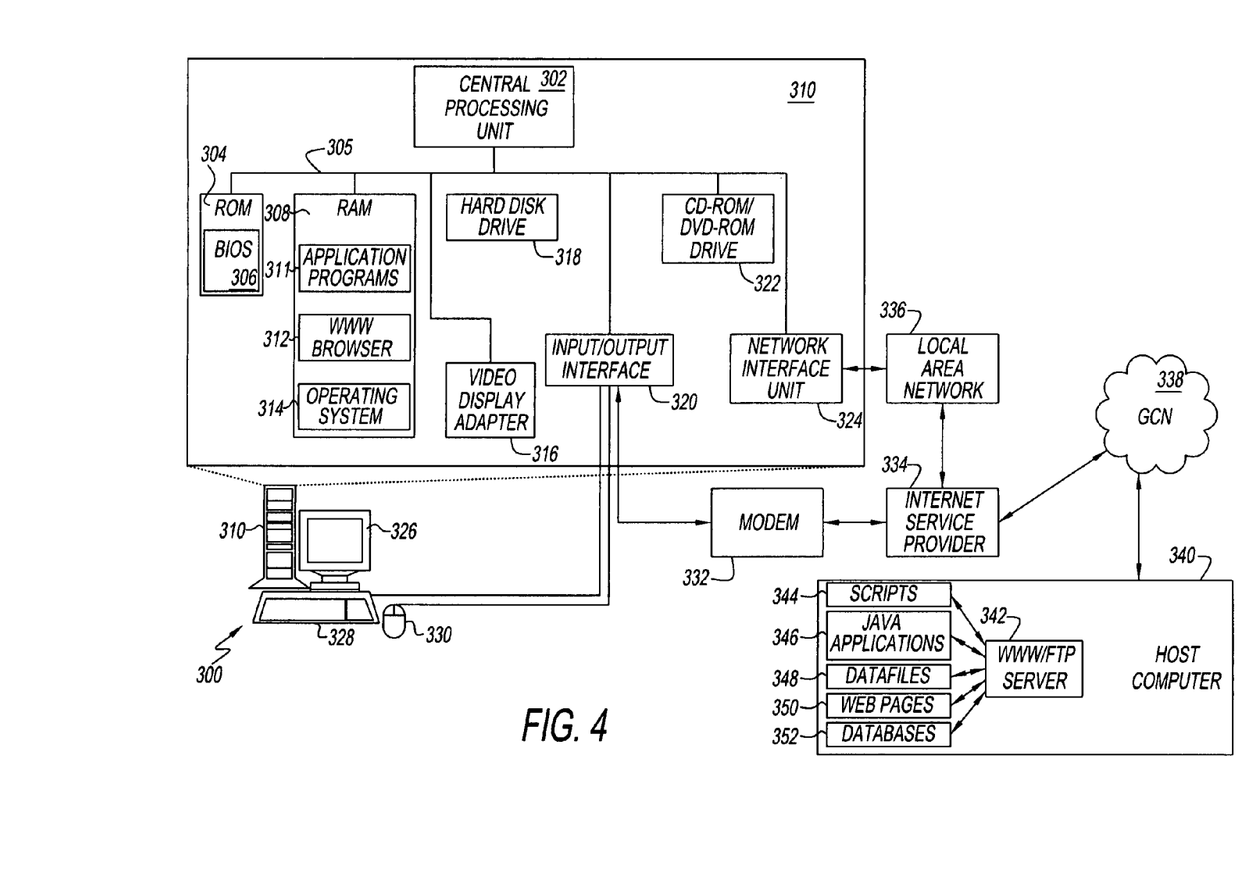
FIG. 4 is a diagram of commonly found software and hardware components of a typical computer system.

In another embodiment, the icon 20 may be a highly intelligent server application that would monitor the network interface 324, keystrokes from the keyboard 328 or mouse 330, or objects appearing on the screen to determine whether a maximum threshold of a certain type of information has been reached. Once reached, the icon 20 may be configured to automatically initiate a recording of a session or a particular part or application appearing on the user's session 30. The icon 20 may also contain a drag and drop area, where only the sessions the user wishes to record are captured by the icon 20 with the other sessions remaining private.

The icon 20 preferably sends data remotely to a listening service such as the database server 40 or the relay server 60. Either of these servers may be running a flavor of Windows, UNIX or Linux platforms. Other platforms may be adopted without departing from the spirit of the present invention. These remote servers represent a remote storage and analysis location, where the recording 35 may be parsed, sorted and analyzed to determine a degree of compliance or a level of a violation of certain preset or standard levels of acceptable human interaction. In another alternative, the entire computer system 5 may be partially or entirely contained within a user's computer 300.

It is preferable that the icon 20 on the user's user system 300 or on another type of user device communicates with the relay server 60. The icon 20 may contain an internal list or a database that would contain information necessary to establish contact with the relay server 60, such as, but not limited to an internet protocol address, a domain name, and any necessary metadata and command syntax necessary to establish an effective one or two way communication. Alternatively, all connectivity information may be stored on the relay server 60. The relay server 60 may periodically poll all subscribing user systems 300. One skilled in the art would appreciate that a single database server 40 or a single relay server 60 may interact with a plurality of individual user systems 300, also known as personal computers. This interaction may include, but is not limited to, software and configuration updates, I-am-alive polling, licensing and subscription sync, and data uploads from icon 20 and downloads to icon 20. Data uploads from icon 20 may preferably include an upload of the recording 35, but may also include others types of data.

The polling may initially be set up according to a user agreement, such as a subscription, a software download, or a licensing agreement. In either scenario, the relay server 60 may periodically update the icon 20, or any underlying client or database server, with latest connectivity information, as well as other information, such as subscription or service updates, software patches and updates, or to transfer any recordings 35 that may be stored locally and that are ready for an upload to the relay server 60 or the database server 40. It should noted that any discussion of the relay server 60 may also be a applied to the database server, and visa versa, since in some alternative embodiments only one of the servers may be present.

The relay server 60 may be capable of authenticating the user communications 35 as well as any search communications, originating from third parties 120. The relay server 60 may also be capable of manipulating a recording file or a data stream that were received from the client session 30. The recording 35 in an unprocessed state may be an image object and may be communicated from the icon 20 to the relay server 60 in a compressed state. The image object may be converted into a character based record or file by using an Optical Character Recognition (OCR) technology, present in either the relay server 60 or the database server 40. Alternatively, OCR routines may be executed on the user session 30, which would result in a character based recording 35. An OCR routine that is local to the icon 20 routine may be preferred to support smaller network bandwidth or lesser available processing capacity by a relay server 60. In another alternative OCR may be replaced by software that is capable of interpreting binary or machine native language symbols of the recording 35, and convert these into a human readable or searchable format. This software component may reside on the user system 300, may be part of the icon 20 or may reside on the relay server 60 or the database server 40.

The converted or OCR processed recording 35 may now contain only character based data that is searchable using character mining routines, such as the data mining module discussed further. Basic character mining routines are common with many high level languages, such as Perl, Python or Ruby, as well with the any other aforementioned, presently existing, or future programming techniques and languages. A character based recording is then transferred to the database server 40. Alternatively, the character based recording may be directly recorded in a database 50 in its entirety or parsed into smaller records, for example by paragraph, by sentence, by word or even by character.

In another alternative, an OCR or a binary recognition component described herein, may communicate directly with the database 50, where any discovered characters or strings may also be stored. In yet another alternative, the OCR or the binary recognition component may contain intelligence to store certain image objects in their entirety. This functionality may be needed to enhance and advance the object of the present invention. The preferred object of the present invention is to capture online dialogue containing offensive, hostile or sexually explicit or suggestive terms. In some cases, the content of such an online session 10 may be in form of a threatening, offensive or inappropriate image. Therefore, it may be highly desirable that the present invention may be able to distinguish between a target component that is a string or a character and a target component that is an image or a graphical object. These hostile, threatening, inappropriate, sexual or otherwise offensive characters or images that may be contained within the recording 35 are also referred to as target components.

The database 50 may already be preloaded with examples of the target components. These examples may also be referred to as benchmark content. The database 50, the database server 40 or the relay host 60 may contain configurable violation thresholds. These violation thresholds would specify when the plurality of the target components within a particular recording 35 crosses the line between safe and unsafe, unsafe and inappropriate, inappropriate and hostile, and between hostile and menacing. Other levels or qualifications may be included, and may be represented by qualitative or quantitative values. These levels may then be used to rank the target content of the recording against the benchmark content already in the database 50. The rank would then be compared against the violation thresholds that may also be contained in the database 50, to determine if an alarm or a notification is necessary. Whether an alarm or a notification is created, the contents of the recording 35 are preferably written to the database 50 for later reference or for the purposes of augmenting the exiting benchmark content. During processing, the recording 35 may be delimited and recorded piecemeal; with any newly discovered target components being compared on an ongoing basis against the existing benchmark content within the database 50. In this type of processing, a recording 35 that has already been reformatted with OCR technology, may also be fully ranked or be ready for a violation determination.

The communication 35 between the icon software 20 that is part of the user session 30 and the relay server 60 or the database 40 may be a transmission control protocol over the internet protocol or TCP/IP, peer to peer protocol, or a token ring protocol, or any other protocol suitable for enabling a data transfer that would support the objectives of the present invention. The recording as well as other data exchange may be sent via standard file transfer protocol (FTP), anonymous ftp, secured ftp (SFTP), or HTTP GET and PUT commands.

It is preferable however, that the recording is transferred using a Windows Communication Foundation (WCF) framework, or its equivalent. In a WCF framework the relay server 60, the database 40, or the icon 20 may be classified as services having a separate proxy handling all of the connectivity information, security requirements, and data transmissions. The connectivity information as well as object call syntax may be advertized by a WCF service in a technology-neutral way, for example as a response to an HTTP-Get prompt. In this architecture, a component requesting a service would be classified as a client, while the component providing a function would be considered a service. For example, the icon 20 may be requesting that the relay server 60 receive and process the recording 35. Therefore the icon 20 would be requesting a server while the relay server 60 would be providing a function. The roles would be reversed if the contact is originating on the relay server 60, which may be requesting some kind of response from the icon 20.

The increased benefit of the preferred transmittal embodiment using WCF is that it may be largely technology neutral and may be easily scalable from an all-in-one local installation to an enterprise or to an internet wide dispersion of components. Technological neutrality arises from the fact that WCF supports bridging software, such as HTTP bridges, and can therefore communicate with embodiments of icon software 20 running on non-Windows based platforms, such as, Linux or Macintosh. Additionally, WCF or its equivalents offer a wide range of security and encryption features, such as, but not limited to a Kerberos or Windows® authentication, use or certificates or tokens, username and password combinations, or any other types of encryption and/or authentication, or any combination of these encryption and/or authentication methodologies.

The search module 110 may reside on the relay server 60 or on the database server 40. The search module would preferably contain a graphical front end and provide an interactive search interface. The search module 110 may contain several levels of searching complexity, ranging from a simple character or number match, to Boolean or Advanced key term matching, complete with globing and expansions.

The search module 110 may contain a presentation layer and may preferably be accessed by authorized third parties 120 via the internet 338, by using a web browser. Third parties 120 may access a particular internet address (a web site) that would host the search module 110, by entering its uniform resource locator (URL) address. The entry would consist of a computer address and a string instruction that is then forwarded over the internet 338 to the computer responding to the particular URL. The string instruction is then interpreted by a web server on the addressed computer. The string instruction and may be encapsulated in the form of a standard common customer gateway (CGI) syntax, or contain any other HTTP required syntax, or a WCF required syntax, or an SSL required syntax or any other required syntax. The string instruction may contain a required command or service module syntax required by the WCF service that supports the search module functionality of the present invention. Such a WCF service may preferably also reside on either the relay server 60 or the database server 40 or any other server aligned with the relay server or the database server 60 or 40. It should be noted that for the purposes of scalability, the relay server 60 or the database server 40 may be split over several hardware enclosures, each with its own CPU 302, where the hardware enclosures would work in concert to magnify the bandwidth of the computer system 5, or to support failover functionality.

The search module 110 may be written in any language that can render or supply web browser content, coupled with a technological ability to render interactive web pages, or web pages that are capable of receiving and responding to input from a user. A typical web page may be rendered in a markup language that a web browser is able to interpret such as HTML or XML or any other markup language capable of rendering an appropriately styled and sized web page. An interactive web page may additionally have a separate interactive content rendered using cascading style sheets (CSS), or in a high level language such as AJAX, ColdFusion, Perl, JavaScript or Ruby. Alternatively, the entire webpage may be rendered in a cascading style sheet that may be written in any high level language mentioned herein or commonly used in the art for this purpose. The search module 110 may be started as a service on either the relay server 60 or the database server 40. The service for the search module 110 may be assigned to a specific port number that may be the same or different from the port number used by the icon 20 to transfer a recording to the relay server 60 or the database 40 or to perform any other remote task. The port referred to would preferably reside within the application layer of OSI defined architecture for computerized transmission. Such a port number may be assigned and managed by the operating system 310 to handle requests for a specific application.

The search module 110 may be managed by a web server, such as Apache Tomcat or Microsoft IIS, which may be configured to listen on a port, such as a default port 80, 8080 or 8000, and directed to start an instance of the search module 110. The search module 110 and its graphical or browser based front end may written in any language, such as, but not limited to Java, C/C++, C#, Ruby, Perl, Python, as well as their parent languages or any dialects influenced by these languages. As an additional or alternative feature, the search module 110 may contain a command line interface that may respond to an HTTP get request or its equivalent with an appropriate search result. Such a command line search module 110 may similarly listen on a port and may be accessed using an IP and port combination.

The search module 110 is intended to be used by third parties 120, preferably by technical administrators and managers of the computer system 5, or by law enforcement or relatives of the user 25. Preferably the search module 110 contains an authorization or authentication routine that verifies whether a third party 120 is able to utilize the search capabilities. The third parties rights may be explicitly provided by an administrator of the present invention or automatically by consent of the user 25. The search module 110 preferably searches the database 50 by matching a search string or a combination of search strings along with any attributes that are composed by a third party 120. Additionally, the search module 110 may contain its own statistical information or may be able to access statistical information compiled by the relay server 60 or the database server 40. Such search module 110 may be able to respond to a query whether a particular target component should be deemed safe or hostile, may return prior incidents or similar incidents involving the same usernames or actual users, of both the offender and the victim, or any other type of relevant and searchable information. The search module 110 may be capable of wrapping individual search terms into a term within a Structured Query Language (SQL), thus constructing a query to be executed on the contents of the database 50, with the results appearing within the search module 110 or sent directly 110A to the third party 120.

The database 50 may preferably be capable of keeping track of records by using a data dictionary. Furthermore, a database 50 should preferably maintain a failure recovery medium to preserve transactions in an event of a failure, crash or in an event of a retraction of a transaction by a user or a process. The examples of databases include, but are not limited to Oracle Rdbms, Sybase ASE, IBM DB2, as well as Informix and MySql. Use of other databases may also be possible, even a simple comma or whitespace separated file lists may be used as a record storage medium.

The particular way in which a database server 40 interacts with the database 50 may likely depend on an embodiment, topology, application, or physical equipment. In general, every high level computer language, as well as any application server contains its own application programming interface (API) with instructions, libraries and sub-routines that enable a seamless communication with any type of a database used. For example, open database connectivity (ODBC) provides a standard by which many languages may connect to a database. Some languages provide proprietary wrappers for ODBC, such as Java's JDBC bridge for OBDC. Other languages or software development platforms may include database classes, objects and services that assist with interaction between the relay server 60, and the database server 40.

Figure 2:
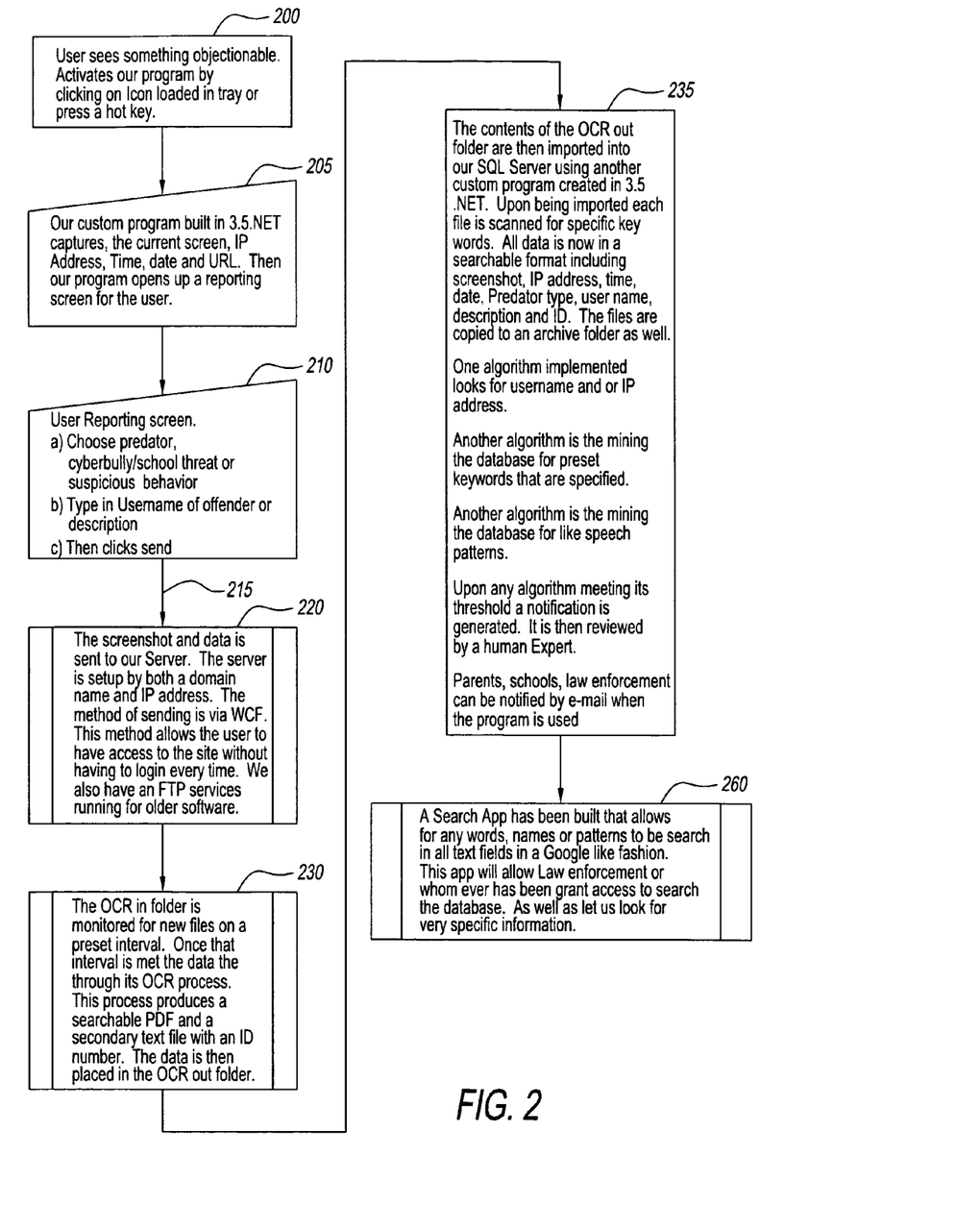
FIG. 2 is a flow chart of the computer enabled method of the present invention.

FIG. 2 is a flowchart describing the computer enabled method disclosed by the present invention. The steps shown are activating an icon on a users personal computer 200, utilizing said icon to capture a screen session on user computer system 205, capturing a user session on said user computer system into a recording 210, sending said captured screen session to a remote database having a benchmark content 215, communicating said recording to a relay server 220, delimiting said recording into a plurality of target components 230, the step of comparing said plurality of target components against said benchmark content 235, and the step of granting search access to said database to third parties 280. For brevity of description, the aforementioned steps may be referred to by their respective number or by a full or partial step title.

The step of activating an icon on a user computer system 200 may include a download or installation of the necessary computer instructions that would be compiled into a computer program or a software package represented by icon software 20, where the download occurs on a users personal computer or user system 300, and the launch of a fully enabled icon software 20 that is ready to record the user session 30. Some or all parts of this step may be necessary for the first launch, only. For example, the download of the icon software 20 may only be needed for the first use of the present invention.

The step 200 entails that the icon 20 has been installed, configured and is loaded, or ready to be loaded into the memory of the personal computer 300, or any other user device, such as but not limited a telephone a cell phone, a smart phone, a personal organizer, a web device, a television, a video or voice recorder, or any other device having a screen or a capability of recording data objects. One skilled in the art would appreciate that there may be many variations and options of creating a computer program personified by the icon 20. It may be highly preferable that a user 25 is capable of launching the icon 20 quickly and conveniently. To facilitate this, it may be preferable that some part of the icon 20 is preloaded into the computer system memory 308 at start-up of the CPU 302 or upon login of a particular user 25.

The launch of the icon 20 should preferably not interfere in the ongoing online session 10, so as to not alarm or disconcert the source of the offensive communication into performing a more drastic action. The icon 20 may also contain functionality to warn the user 25 that a source of the offensive communication may be attempting to perform other undesirable or invasive tasks, such as, but not limited to logging into the user system 30, attempting to view or perform other operations with system data, or install or remove applications, such as sniffers, backdoors, and other hackwork and spyware. In another alternative, the icon 20 may be able to alert a firewall, anti-spyware, or another intrusion prevention means. Additionally, it would be preferable that part of the activation step 200 includes routine maintenance functions of the icon 20, such as, but not limited to search and installation of updates, internal error reports and licensing maintenance. Maintenance and transfer of the recording may occur over the same or different communication channels between icon 20 and the relay server 60 or the database server 40.

The step of utilizing said icon to capture a screen session on a user device 205 preferably refers to utilizing the icon 20 to capture objectionable communication. In Windows® based embodiments the icon 20 may be running as a background process, with some representation of its presence manifested on the user screen 30, such as a miniature icon residing in the notification tray of the task bar. Alternatively, the computer logic enabling the icon 20 may listen to a specific activation event, such as, but not limited to a depression of a designated keyboard key or a hot key, or a combination of such keys. Alternatively, the icon 20 may periodically scan the user screen 30 for objectionable text.

The user screen session 30 or a user device may also be referring to, or attributed to a mobile device, such as, but not limited to a cell phone 36, an organizer, a smart phone, a web device, a television, an electronic gaming device, a telephone, an e-fax, or any other type of electronic or telecommunication display, or any device with a display. A user device be capable of supporting a background execution of the icon software 20, or the icon 20 may be initiated separately, such as a result of menu item selection. This icon 20 may have all or some of the functionality of the icon embodiment that may exist on a user system 300. Alternatively or additionally, such the icon 20 running on a non-user system 300 may be supporting of services provided by the device. For example, the icon 20 may have an ability of capturing text, voice and/or video chat, using speech recognition, or capturing images or video. Such recording would then be transferred to the computer system 5 as a recording of objects, such as image objects, or audio/video objects. The computer system 5 may contain modules, such as OCR that may parse and extract characters and images from such objects, or which may first convert the recording in an intermediary format that may then be sent to a module such as an OCR.

An icon 20 may contain command-line interface, or a graphical interface, or a combination of both interfaces. A user may choose, which particular communication sessions or application screens should be captured, otherwise all screens and sessions currently open, maximized or minimized may be captured into a recording. In another of the same embodiment, individual sessions maybe dragged and dropped into an area provided by the icon 20. Additionally, it may be possible to upload files containing independently saved sessions or application screens, into the icon 20. It may also be preferable for the icon 20 to be capable of identifying which sessions are open, or distinguish which sessions are in the foreground and which are in the background, selecting only sessions within a specific group of sessions.

The step of capturing a user session on said user computer system into a recording 210 preferably involves the icon 20 and a sub-screen or sub-menu included with the icon 20. However, all operations may be done from a single screen of the icon 20. A sub-screen or a sub-menu, if included, may be referred to as a user reporting screen. A user reporting screen may prompt for a type of reporting, for example, a cyber bully or a predator. Other type of reporting may be more applicable to a professional or work related setting, where a type of reporting may include a breach of company policy, a general unwanted contact. Some types of reporting may be instead of, or in addition to the standard cyber bully or predator reporting. The user 25 may be capable of entering any or all information pertaining to the source of the unwanted or offensive contact, such as, a user name, a real name, a position, address or location, explanation of why contact may be offensive, or description of how the user and the source became acquainted, and any other relevant information that may assist in recording the contact, seek prior acts or alert law enforcement and other regulatory bodies. The resulting recording may be an image file or a binary archive that is compact enough to be sent from a user system 300 to a remote relay server 60 or a database server 40, with reasonable expediency and efficiency.

The step of sending said captured screen session to a remote database having benchmark content 215 preferably describes the application of the claimed method to the preferred or alternative networking and data transfer methodologies. As an example of step 215 may be the icon 20 contacting the relay server 60 or the database server 40 based on a pre-existing setting specifying the remote address of these servers 60 or 40. Preferably, the addressing is based on interne protocol addressing system that is based on either the 32 bit or a 128 bit addressing, or any other addressing that is commonly used in the art and for this purpose. The address may be preset during installation or activation of the icon 20, or periodically, passively supplied by the relay server 60 or the database server 40.

The icon 20 may use any type of file and data transfer techniques, such as File Transfer Protocol, or a Secure File Transfer Protocol, or a Remote Copy Protocol. However, preferably, the recording may be transferred using a WCF. Using WCF may be more efficient and faster method of data transfer, since in WCF data can be communicated directly between the supplier and the consumer of the data, bypassing the lengthy process of recording a file, transferring it to a target location, and then reading the file from the new location. Additionally, WCF may provide enhanced security over older FTP and SFPT technology. Another benefit of using the preferred data transfer technique is that it permits the icon 20 to log in once for the entire length of the session or the entire active state of the icon 20. Alternatively, the login may occur automatically in the background, and remain logged in for a large portion of the active period.

The step of communicating said recording to a relay server 220 includes sending the recording to the relay server 60 or the database server 40, in an embodiment lacking the relay server 60. The database server 40 may function as a backup to the relay server 60, in the event of an outage on the relay server 60. The relay server 60 may preferably be a remote server to the icon 20 and is capable of serving multiple user sessions 30. Each user session 30 may communicate and exchange data with the relay server 60 apart from, and completely insulated from activities by other user sessions 30. It is highly preferable that individual user sessions 30 are not aware of the presence of other user sessions 30, and do not affect each other's activities.

The step of delimiting said recording into a plurality of target components 230 may preferably occur on the relay server 60. The relay server 60 may be equipped with optical character recognition (OCR) software. OCR software would process the binary format of the recording 35 received from the icon 20 by extracting characters, character strings, sentences or graphical objects. A recording 35 may consist of screenshots and other data. It may be preferable that an OCR may be capable of determining which characters should be grouped together to form words and sentences. It may also be preferable to extract graphical objects that may be deemed offensive or otherwise objectionable. The characters and other objects extracted with OCR represent target components that will be now compared to the benchmark components, to determine whether the contact was in violation of certain communication norms or regulations. Other examples of target components may be classified as identifying information, such as, but not limited to the offender's or victim's interne address, geographical location, age, sex, time and date of contacts. An example of OCR software may be Maestro Recognition Server® from OCITech®; however, many other OCR platforms may be implemented with the relay server 60.

The step of comparing said plurality of target components against said benchmark content 235 may occur on the relay server 60 or on the database server 40. At this point the recording has preferably been processed by OCR software and even converted into a searchable text format. For example a typical chat screen may contain graphical widgets and diagrammatic windowing information in addition to the standard character based conversation of the chat participants. Chat participants may also splice up their messages with illustrations, such as smiley faces and animations. Existence of graphical elements will likely lead to errors in a character based searches, since a binary file usually combines characters with non parse-able or display-able symbols. Therefore, OCR or another form of parsing or delimiting technology may be highly preferable for separating characters from graphics and other binary objects. Once this is done, a standard character search may be performed on the character components of the recording 35, while a binary or object search may be done on the graphical or non-character part of the recording. The object of the search may be to extract particular target components, their frequency and severity, and compare the result against a benchmark content stored on the database 50.

The recording that has preferably been processed by OCR may then be searched by automated data crawlers such as the data mining module of the present invention or other modules that determine existence of a particular target component within the recording 35. The analysis of the recording 35 may be based on many algorithms. For example if a user session 30 has transferred a cyber bully type of a recording, the algorithm may attempt to initially obtain a user name and/or password of the alleged cyber bully and the victim, or user of the user session 30. This information would then be compared against equivalent content within the database 50, to determine whether there was a prior incident involving either of the parties, together or separately, or whether other contact information may exist for the alleged cyber bully.

Other algorithms may first consult the benchmark database 50 for a collection of target components that may be present in this type of a recording 35. A character search of the contents of a recording 35 may be used to determine whether any of these terms are present and their frequency. An additional level of sophistication may also be capable of determining the demeanor and predisposition of the author or the alleged cyber bully, based on specific phrases, their contextual location, and of specific speech patterns. Other keywords may be specified manually and compared against the target components present in the recording to determine a match and frequency of the match. Still other algorithms may look for a frequency of something appearing or not appearing, where the frequency variable would influence a severity variable, or visa versa. Each algorithm or a combination of algorithms, used separately or nested, may return a quantifiable result. Algorithms look for IP address, user or screen name, name of the location where the offence is happing (which chat room or what website, blog or e-mail sender) time and date, speech patterns and keywords. Because one person can use more than one computer and can change their screen or user name we cannot just use one algorithm.

At the end of the analysis, the data mining module, or the business logic present on the relay server 60 or the database server 40 may determine the level of violation exhibited by the communication content present in the recording. The level of a violation may be assigned a certain grade level or a certain severity description, may be color coded or classified in any other manner common in the field. Either the database server 40 or the relay server 60 may be instructed to alert an appropriate regulatory body or division, in the event that some preset violation threshold has been breached. It may then be reviewed by a human screener, once the screener has determined that this is a true problem then the regulatory body or division preferably represents the third parties that may be allowed access to or hold a unique interest in avoiding violations. Examples of such third parties may be, but is not limited to, law enforcement agents, policy enforcement officials, parents, guardians, school officials or corporate officers.

The step of granting search access of the database to third parties 280 may be included, to provide law enforcement and other interest holding third parties, with independent or separate access into the database 50. Such access may be provided with search module, such as described in FIG. 1 as item 110.

Figure 3:
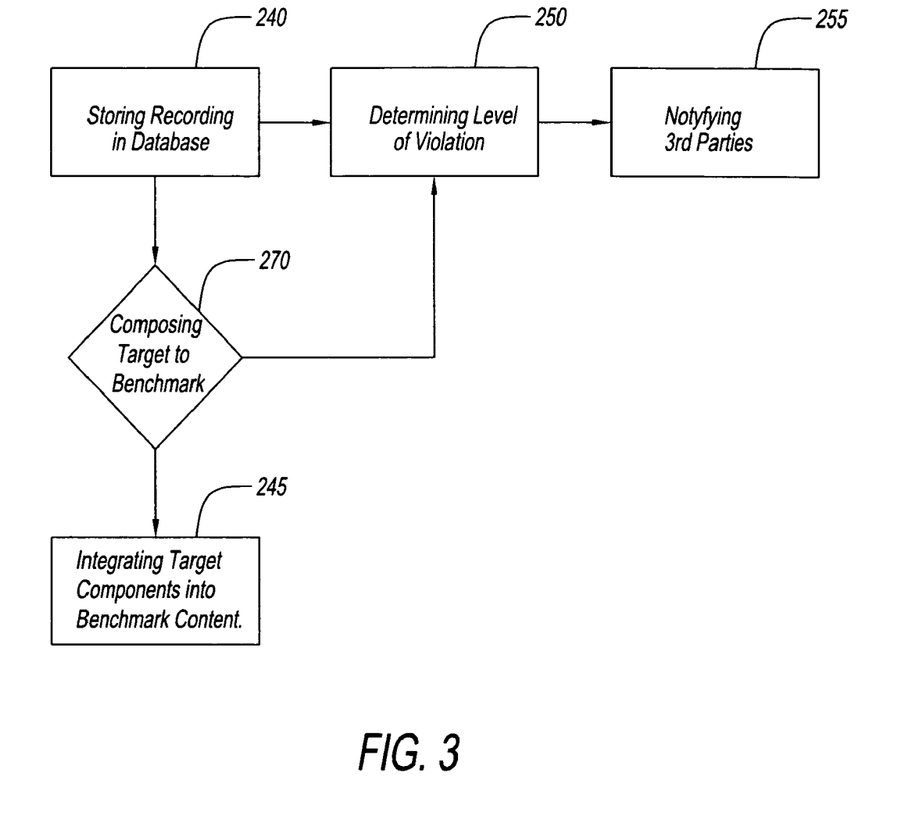
FIG. 3 is a more detailed flow chart of some aspects of the computer enabled method.

FIG. 3 provides further detail on the step of comparing said plurality of target components against said benchmark content 23. This step may be broken up into the following steps: storing said recording within said database 240, integrating said plurality of target components into said benchmark content 245, determining a level of violation 250, notifying third parties of said level of violation 255, and the step of utilizing a data mining module to compare said plurality of target components against said benchmark content 270.

The step of storing said recording within said database 240 describes a preferable location for storing the contents of a recording 35. The contents or target components may be placed in a special transactional table space or an additional database that may exist for staging, transactional or other temporary purposes. Alternatively, there may be a single database 50 for benchmark and target components, with the target components being assigned special flags to notify the database server 40, or a third party 120 that is querying the database, of the temporary nature of the target components, if such access is in fact provided. In another alternative, the target components within the recording 35 may be stored within a text file or an object file that is separate from or part of the recording 35, whose content does not become part of the database 50 until step 245, as will be described herein.

The step of utilizing a data mining module to compare said plurality of target components against said benchmark content 270 describes a way of arriving at a violation level and thereby determining whether a notification of third parties is warranted. The violation may be determined by using at least one of the algorithms described in FIG. 2, which may be enabled using the data mining module of the present invention. The data mining module may be considered as the most significant part of the business logic of the present invention, since it performs the comparisons between target components and benchmarks components, and arrives at a level of violation. The business logic or the data mining module may be a collection of several lesser software packages or minor modules, or one large module. The data mining module may reside on the relay server 60 or the database server 40. It may also reside on the icon 20, especially in an embodiment where the icon 20 and the database 50 are part of a self contained embodiment of the present invention.

The data mining module may be written in any of the languages heretofore described, or may be written in a separate language, using a different architecture. One skilled in the art of software development would appreciate that different components may utilize computer language and architecture that best suits the purpose of the software, and that most of the disparate components may be integrated together at compile time, run-time, by using networking architecture or built-in software bridges, such as compatibility modules.

The step of determining a level of violation 250 compares the result generated in step 270 by the data mining module against an acceptable or reasonable level of similar conversations in the same or similar settings. Since the intended user of the present invention may be a minor or a child, where the parents or parties responsible for this child may be seeking to create a safe or at least a defensible internet surfing environment, the violation level of some communications may be set to a very low threshold; meaning that even a single objectionable or suggestive statement may be considered as a reportable violation. In other environments, such as professional settings, the thresholds may be adjusted to accept some forms of communications as normal, while still maintaining a low threshold on other types of communication. For example, where a user is a minor, any communication involving sexual messages and innuendoes or any forms of violence or bullying may be strictly prohibited and would immediately create an unacceptable level of violation that would preferably need to be reported to an appropriate regulatory body, or even to parents or guardians of the minor. On the other hand, in business or professional circumstances, where the present invention is being utilized to monitor communication between workers of a construction company or any other settings where a certain degree of vulgarity may be acceptable, a threshold on the use of profane communication may be set higher than for a user who is a minor, while the threshold on violent or sexually explicit or suggestive language may continue to be low. Preferably the data mining module carries out the step 250 and obtains the resulting level of violation. The data mining module and any sub-module may be prompted into undertaking the process and arriving at the result either automatically by internal processing of computer system 5, or by a human operator. Furthermore, it may be highly preferable that a human screen is then utilized to corroborate the violation result arrived at by the data mining module or one of its sub-modules.

In the present invention, it may be preferable that a user 25 may be capable of reporting an attack or an offensive communication anonymously, and that the report or the reported incident is not conveyed to the user's parents, relatives, guardians, superiors or business associates. This may be preferred since a user 25 may fear reprisal, curtailment of activities, or may have been engaging in unauthorized or secondary activities during the incident. However, such a user still maintains a right to be free of harassment, while law enforcement and other regulatory bodies may still entertain a significant interest in stopping sexual predators, cyber bullies, thugs, gangs, or other undesirables. Alternatively, the precise reporting structure may be configurable based on the wishes of the user 25, the user's parents, guardians, superiors, or by policy or statutory requirements. The configuration for reporting and for levels of violation may be stored within the database 50 or internally within the data mining module. It may also be preferable that the levels of violation and the reporting structure may be configured within icon 20 and stored in the user system 300, on the relay server 60, on the database server 40, or in the database 50. It may also be possible that the reporting structure and levels of violation may be sent from the icon 20 as an attribute in the recording or in a supplementary file or data stream.

The present invention may also contain a logging feature that may be accessed by the user, or by appropriate third parties, such as but not limited to the user's parents or guardians, and regulatory or enforcement authorities. Such logging may keep a record of any communication submitted in a record as a result of activating icon 20. Such functionality may be desirable if a user does not wish for any communication to be sent to law enforcement, or in the event that a communication or an application may not be infringing or in violation, and yet the user may need to maintain a record for later reference. Such logging may be maintained locally on the user system 300 or remotely on the database 50. The user may be able to specify what response may be desired prior to submitting a specific recording. For example, a user may not wish to report a particular communication to law enforcement, but wishes to monitor future behavior in an event that such undesirable behavior continues or escalates. This user 25 may want or need to create a recording 35 for future reference, and may communicate his or her preference as an attribute in the recording itself or in a supplementary file or data stream.

The step of notifying third parties of said level of violation 255 may include an action of sending an alert to a subscribing regulatory authority. An alert may be manual or electronic, as illustrated in item 110A (FIG. 1), informing law enforcement or an appropriate regulatory agency that a violation has been committed, and the need to investigate the violation. Regulatory, law enforcement, and disciplinary bodies may be subscribing to services of the present invention, or may be passive recipients of this information 110A from the present invention. In actuality, once the data mining module determines that a level of violation has been breached, it generates a message to the database server 40 or the relay server 60, which is then forwarded to the appropriate receiving third party 120. The information regarding the appropriate receiving third party 120 for a particular message may be maintained within the database 50 or on the relay server 60, or on the database server 40; with periodic updates requested from or received from the aforementioned third parties 120. It may also be highly preferred that a detailed record of actions taken in step 255 may also be stored within the database 50 and linked to the perpetrator or victim for a later reference or precedence.

The step of integrating said plurality of target components into said benchmark content 245 may be performed at any time during the execution of the claimed method. However, it is preferable to perform this step at the end of the claimed method, so as to avoid skewing the results obtained by the data mining module in step 270.

Integration of target components into the benchmark content may be carried out to the database content referring to the parties appearing in a particular recording 35, or may be carried out to the overall benchmark content. For example, it may be taken as a present state of knowledge that what is socially acceptable or objectionable may change over time. Additionally, some terms or speech patters fade into oblivion and are replaced with modified variations or entirely new statements that may contain the same or similar meaning. To maintain accuracy of the violation results, the data mining module needs to compare target components against a benchmark content that is socially current. Therefore, a separate module or logic built into the data mining module may be responsible for tracking speech trends, to detect an increase or a decrease of use of certain expressions or idioms. This step may also be done manually with the assistance of a human monitor, based on statistics of usage or prevalence of terms that may be generated by the data mining module or a separate trend monitoring module. Thus integrating the target components of the present recording 35 may have an affect the overall technique of determining violations.

Step 245 may have a more localized affect. For example, the present invention may be used to monitor activities of a particular individual or a group of individuals. Communications by these individuals or to these individuals may be benchmarked according to their prior communication to identify a trend or a pattern. The data mining module may identify a particular individual automatically, by using a user name, internet protocol address, any URL or by individuals or sites contacted, by an internet protocol (IP) address, a user or a screen name, or any combination thereof. In step 245 any contents of a recording 35 that are attributable to a particular user name may be added to the database 50 as associated with this username for any future analysis.

FIG. 4 contains a further description of the hardware and software components that are contained in a machine that would enable some components of the present invention, in particular the user system 300 containing the icon software 20. Therefore, FIG. 4 and the following discussion are intended to provide a brief, general description of a suitable computing environment in which the invention may be implemented. Referring now to FIG. 4, an illustrative environment for implementing the invention includes a conventional personal computer 300, also referred to elsewhere as a user system, including a processing unit 302, a system memory, including read only memory (ROM) 304 and random access memory (RAM) 308, and a system bus 305 that couples the system memory to the processing unit 302. The read only memory (ROM) 304 includes a basic input/output system 306 (BIOS), containing the basic routines that help to transfer information between elements within the personal computer 300, such as during start-up. The personal computer 300 further includes a hard disk drive 318 and an optical disk drive 322, e.g., for reading a CD-ROM disk or DVD disk, or to read from or write to other optical media. The drives and their associated computer-readable media provide nonvolatile storage for the personal computer 300. Although the description of computer-readable media above refers to a hard disk, a removable magnetic disk and a CD-ROM or DVD-ROM disk, it should be appreciated by those skilled in the art that other types of media are readable by a computer, such as magnetic cassettes, flash memory cards, digital video disks, Bernoulli cartridges, universal serial bus flash drives, external hard and flash drives, and the like, may also be used in the illustrative operating environment.

A number of program modules may be stored in the drives and RAM 308, including an operating system 314 and one or more application programs 310, such as a program for browsing the world-wide-web, such as WWW browser 312. Such program modules may be stored on hard disk drive 318 and loaded into RAM 308 either partially or fully for execution.

A user may enter commands and information into the personal computer 300 through a keyboard 328 and pointing device, such as a mouse 330. Other control input devices (not shown) may include a microphone, joystick, game pad, satellite dish, scanner, or the like. These and other input devices are often connected to the processing unit 300 through an input/output interface 320 that is coupled to the system bus, but may be connected by other interfaces, such as a game port, universal serial bus, or firewire port. A display monitor 326 or other type of display device is also connected to the system bus 305 via an interface, such as a video display adapter 316. In addition to the monitor, personal computers typically include other peripheral output devices (not shown), such as speakers or printers. The personal computer 300 may be capable of displaying a graphical user interface on monitor 326.

The personal computer 300 may operate in a networked environment using logical connections to one or more remote computers, such as a host computer 340. The host computer 340 may be a server, a router, a peer device or other common network node, and typically includes many or all of the elements described relative to the personal computer 300. The LAN 336 may be further connected to a GCN service provider 334 ("ISP") for access to the GCN 338. In this manner, WWW browser 312 may connect to host computer 340 through LAN 336, ISP 334, and the GCN 338. Such networking environments are commonplace in offices, enterprise-wide computer networks, intranets and the GCN.

When used in a LAN networking environment, the personal computer 300 is connected to the LAN 336 through a network interface unit 324. When used in a WAN networking environment, the personal computer 300 typically includes a modem 332 or other means for establishing communications through the GCN service provider 334 to the GCN. The modem 332, which may be internal or external, is connected to the system bus 305 via the input/output interface 320. It will be appreciated that the network connections shown are illustrative and other means of establishing a communications link between the computers may be used.

The operating system 314 generally controls the operation of the previously discussed personal computer 300, including input/output operations. In the illustrative operating environment, the invention is used in conjunction with Microsoft Corporation's "Windows 98" operating system and a WWW browser 312, such as Microsoft Corporation's GCN Explorer or Netscape Corporation's GCN Navigator, operating under this operating system. However, it should be understood that the invention can be implemented for use in other operating systems, such as Microsoft Corporation's "WINDOWS NT", "WINDOWS 2000", "WINDOWS XP", "WINDOWS VISTA", "WINDOWS 7" and various version of the "WINDOWS SERVER" operating systems, IBM Corporation's "OS/2" operating system, SunSoft's "SOLARIS" operating system used in workstations manufactured by Sun Microsystems, and the operating systems used in "MACINTOSH" computers manufactured by Apple Computer, Inc, as well as for any flavor of UNIX and Linux operating systems available. Likewise, the invention may be implemented for use with other WWW browsers known to those skilled in the art.

Host computer 340 is also connected to the GCN 338, and may contain components similar to those contained in personal computer 300 described above. Additionally, host computer 340 may execute an application program for receiving requests for WWW pages, and for serving such pages to the requestor, such as WWW server 342. According to an embodiment of the present invention, WWW server 342 may receive requests for WWW pages 350 or other documents from WWW browser 312. In response to these requests, WWW server 342 may transmit WWW pages 350 comprising hyper-text markup language ("HTML") or other markup language files, such as active server pages, to WWW browser 312. Likewise, WWW server 342 may also transmit requested data files 348, such as graphical images or text information, to WWW browser 312. WWW server may also execute scripts 344, such as CGI or PERL scripts, to dynamically produce WWW pages 350 for transmission to WWW browser 312. WWW server 342 may also transmit scripts 344, such as a script written in JavaScript, to WWW browser 312 for execution. Similarly, WWW server 342 may transmit programs written in the Java programming language, developed by Sun Microsystems, Inc., to WWW browser 312 for execution. As will be described in more detail below, aspects of the present invention may be embodied in application programs executed by host computer 342, such as scripts 344, or may be embodied in application programs executed by computer 300, such as Java applications 346. Those skilled in the art will also appreciate that aspects of the invention may also be embodied in a stand-alone application program.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A computer system for reporting online sessions comprising:
    an icon, said icon appearing on a user device screen and said icon controlling a client application containing instructions that provide a functionality comprising:
        launching, on activation of said icon-controlled client application by a user, a user-reporting sub-screen; and
        automatically capturing a current screen session on said user screen including said reporting sub-screen or menu, if currently displayed, as a recording;
    a database server configured to automatically extract a plurality of target components from said recording by using, in part, optical character recognition software configured to extract characters and graphical objects, and to separate said graphical objects from said characters to eliminate errors in a subsequent character based search;
    a database configured to store said plurality of target components, said database having a benchmark content comprising a plurality of preloaded, socially current, exemplary expressions, idioms and speech patterns, defining, in part, at least two configurable violation thresholds, including a violation threshold between unsafe content and inappropriate content, and a violation threshold between inappropriate content and hostile content;

automatically comparing, using a data-mining module operating on said database server, said plurality of target components with said benchmark content to determine if a violation threshold has been crossed by said plurality of target components extracted from said recording, and if a violation threshold has been crossed, automatically deciding whether to alert one or more third parties, said third parties being selected, in part, dependent on a level of violation crossed and on a configurable reporting structure directly accessed by said icon-controlled client application, wherein the level of violation is based on specific phrases, contextual location, or specific speech patterns.

2. The computer system of claim 1, further comprising a relay server, and wherein said client application communicates said recording to said relay server.

3. The computer system of claim 2, wherein said relay server converts said recording into a searchable format.

4. The computer system of claim 3, wherein said database server extracts a plurality of target components from said searchable format.

5. The computer system of claim 1, wherein said plurality of target components comprise one or more character strings.

6. The computer system of claim 1, wherein said plurality of target components comprise at least one object.

7. The computer system of claim 6, wherein said plurality of target components are taken from a group comprised of an address, a set of keywords, an internet protocol address, a user or a screen name, speech pattern, or any combination thereof.

8. The computer system of claim 1, further comprising a search module, said search module searches said database.

9. A computer enabled method for reporting online sessions comprising the steps of:

activating, using an icon on a user computer system, a client application containing instructions that provide a functionality comprising:

launching user-reporting sub-screen; and automatically capturing a current screen session on a user device including said user-reporting sub-screen or menu, if currently displayed, as a recording;

automatically communicating, by said client application said recording to a relay server;

automatically delimiting said recording into a plurality of target components using, in part, optical character recognition software configured to extract characters and graphical objects, and to separate said graphical objects from said characters to eliminate errors in a subsequent character based search;

automatically sending said plurality of target components to a remote database having a benchmark content, said benchmark content comprising a plurality of preloaded, socially current, exemplary expressions, idioms and speech patterns, defining, in part, at least two configurable violation thresholds, including a violation threshold between unsafe content and inappropriate content, and a violation threshold between inappropriate content and hostile content;

automatically comparing said plurality of target components against said benchmark content, using a data-mining module operating on said database server, to determine if a violation threshold has been crossed by said plurality of target components extracted from said recording; and if a violation threshold has been crossed, automatically deciding whether to alert one or more third parties, said third parties being selected, in part, dependent on a level of violation crossed and on a configurable reporting structure directly accessed by said icon-controlled client application, wherein the level of violation is based on specific phrases, contextual location, or specific speech patterns.

10. The computer enabled method of claim 9, further comprising the step of storing said recording within said database.

11. The computer enabled method of claim 9, further comprising a step of corroborating said level of violation using a human screener.

12. The computer enabled method of claim 9, further comprising the step of granting search access to said database to third parties.

* * * * *